Jan. 5, 1971  J. E. O'NEAL  3,552,782

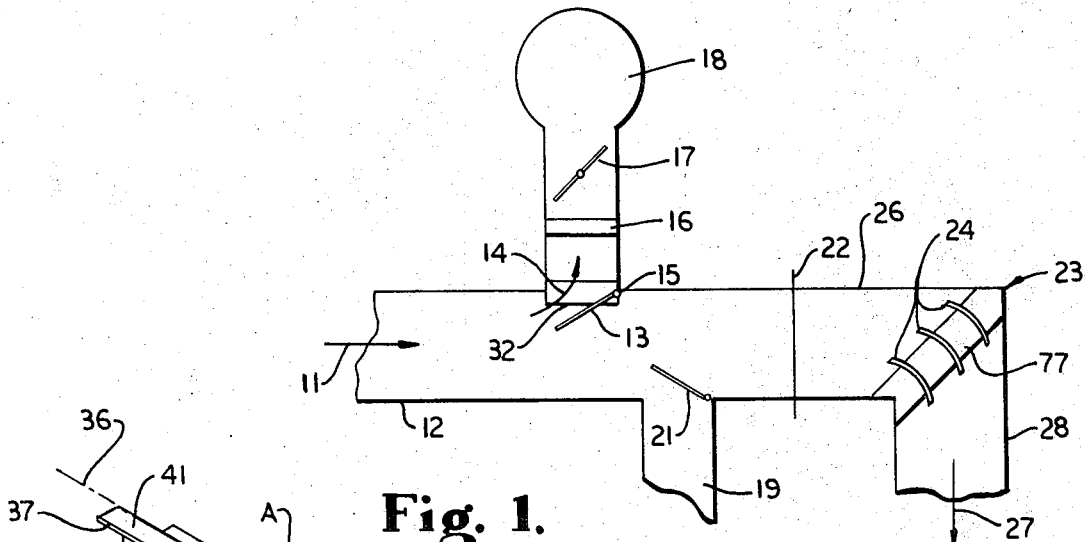

DUCT CONNECTOR SYSTEM

Filed Aug. 13, 1968  2 Sheets-Sheet 2

INVENTOR
JOHN E. O'NEAL
BY
Woodard, Weikart, Emhardt & Naughton
Attorneys

United States Patent Office 3,552,782
Patented Jan. 5, 1971

3,552,782
DUCT CONNECTOR SYSTEM
John E. O'Neal, Indianapolis, Ind., assignor of sixty percent to John J. Cotton, Indianapolis, Ind.
Filed Aug. 13, 1968, Ser. No. 752,381
Int. Cl. F16l 25/00
U.S. Cl. 285—398                                    5 Claims

ABSTRACT OF THE DISCLOSURE

Air conditioning system ducts of compressed glass fiber insulating boards are connected together and to dampers, heat exchangers, turning vanes, and other accessories by a sheet-metal rail formed to receive and support lengths of duct.

BACKGROUND OF THE INVENTION

Field of the invention

This invention relates generally to fluid handling systems, and more particularly to ductwork and accessories for air conditioning systems.

Description of the prior art

Prior art air conditioning systems employing sheet metal ductwork are well known. Such ductwork is well known and widely used for conveying a variety of gases, but is probably more extensively used for conveying air than for any other purpose. The air can be warm, cool, dry, humid and all of these conditions of air can exist in at least some part of an air conditioning system. So the term "air conditioning" as used herein should not be understood in any limiting sense at all. In instances where sheet metal ductwork has been used and it is desired to avoid heat transmission through the ductwork, various means of insulation have been employed, including external as well as internal insulating mats or pads, for example. In addition to sheet metal, other materials have been proposed for the ductwork itself, including boards made of compressed glass wool fiber or other materials. Such boards are comparatively light, reasonably rigid, and have good thermal and sound insulating properties. Heretofore, however, there have been some problems in devising ways and means of using such materials. An example of an effort to connect two sections or lengths of such materials is presented in the United States Pat. No. 3,001,805 issued Sept. 26, 1961 to Jones et al. Another is U.S. Pat. 3,347,569 issued Oct. 17, 1967 to Lindgren. An earlier effort is shown in the Pat. No. 2,338,191 issued Jan. 4, 1944 to Lumm. In spite of these prior art efforts, little progress has been made in the use of such duct materials, and the problems remaining have included cost of connector components, inconvenience in use, necessity for special tools, insufficient reliability of the finished installation, and insufficient versatility. The present invention overcomes these problems.

SUMMARY OF THE INVENTION

Described briefly, in a typical embodiment of the present invention, a duct connection includes a length of duct received in a channel, the channel being formed in a sheet metal rail, and having four portions, one receiving the marginal end portions of each of the four walls of the length of duct.

Various accessories or hangers are connected to the rail at various points in the system to achieve the various performance characteristics desired in such a system.

BRIEF DESCRIPTION OF THE DRAWINGS

The full nature of the invention will be understood from the accompanying drawings and the following description and claims.

FIG. 1 is a schematic plan view of a portion of an air conduit system showing the locations possible for various components described in detail in connection with other figures of drawing.

FIG. 2 is a perspective view of a duct connector rail incorporating some principles of the present invention.

FIG. 3 is a perspective view of two lengths of duct connected together by a connector of the type shown in FIG. 2 and mounting a volume damper with a connector of the type shown in FIG. 2.

FIG. 4 is a perspective view of a length of duct having a splitter or diffuser damper mounted therein.

DESCRIPTION OF THE PREFERRED EMBODIMENTS

Figure 5:
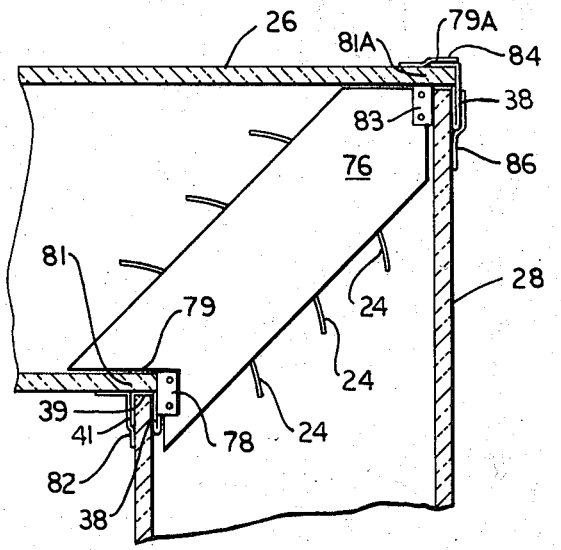
FIG. 5 is a sectional view through a corner of a duct, showing turning vanes mounted according to the present invention.

Referring now to the drawings in detail, and more particularly to FIG. 1, a portion of an air conduit system is shown schematically with air moving in the direction of arrow 11 through the duct section 12 and encountering a splitter damper 13 to divert a portion of the air flow in the direction of arrow 14 through a heat exchanger 16 and volume control damper 17 to a diffuser at 18. A branch is provided at 19, with another splitter damper 21 for diverting a portion of the air into this branch.

Although various lengths of duct might be used in the portions of the system thus far described with reference to FIG. 1, a line is drawn at 22 to illustrate another possible location for a joint between lengths of duct. At the corner 23, the turning vane assembly is employed including the turning vanes 24. Accordingly the air is turned from the direction of arrow 11 in the duct section 26 to the direction of the arrow 27 in the duct section 28.

Referring now to FIG. 2, there is shown a length of connector provided according to the invention. This is a strip of sheet metal including a base rail portion 31 beginning at the marginal edge 32 and folded back upon itself at a fold line 33 and then folded outwardly at line 34 and then folded back again on a third fold line 36 and extending to the marginal edge 37. The portions 38, 39 and 41 form a channel to receive a duct member therein.

Figure 6:
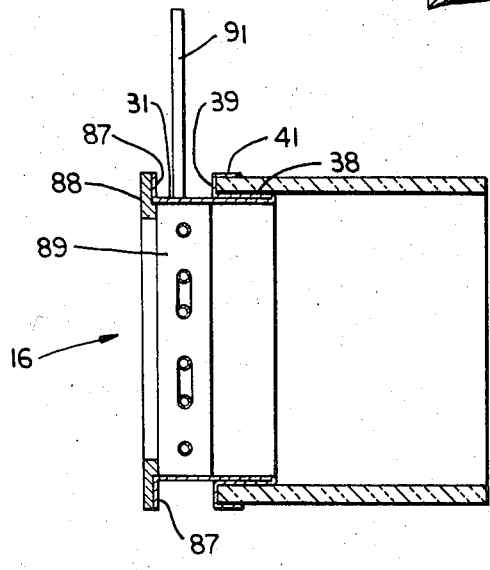
FIG. 6 is a vertical section through a length of duct and showing a heat exchanger mounted therein according to the present invention.

Referring now to FIG. 3, one use of the member of FIG. 2 can be understood conveniently by employing the same reference numerals. A length of duct 42 has a top wall 43. This is of a glass wool material formed into a board having a nominal thickness of one inch. An example of such material is known as the Owens-Corning "Fiberglas" industrial duct system marketed using its trademark "Fiberglas" by the Owens-Corning Fiberglas Corp., Toledo, Ohio. The end margin 44 of this top wall 43 is received in the channel formed by the portions 41, 39 and 38 (not shown in FIG. 3) of the member of FIG. 2. FIG. 6 illustrates further the way in which the duct top board is received in the channel and rests on the potrion 38.

Referring back to FIG. 3, it can be noted that the side wall 46 of the duct is also received under a flange 41A, abuttingly engages the flange 39A and that a portion 31A projects therefrom in the same relationship thereto as does the portion 31 with respect to portion 39. Similarly a flange 39B has a portion 31B associated therewith and a flange 39C has a portion 31C associated therewith. Perhaps it can now be recognized that the arrangement shown in FIG. 3 can be provided by taking the member of the type shown in FIG. 2 and cutting the flanges 39 and 41 on vertical planes containing the lines A, B, and C, and folding the member into a polygonal frame which, in this instance, happens to be rectangular. Obviously the member as shown in FIG. 2 is not long enough to form a polygonal frame of the size shown in FIG. 3, but it is believed that the procedure can be readily understood from this description. Once the base rail 31 is folded on the three lines A, B, and C, perpendicular to the fold line 33, the opposite ends of the rail can be connected together by a seam weld, by riveted flanges, or by other means. Then, to provide the accessory shown in FIG. 3, a damper blade 47 is pivotally mounted to pivot on an axis 48 passing through the parallel flanges 41A and 41C (not shown in FIG. 3). An appropriate lever 49 can be provided on the damper shaft for external control thereof. Such a unit might be provided for damper 17 of FIG. 1, for example.

Referring further to FIG. 3, a duct length 51 will be noted behind the length 42. This is connected to the duct length 42 by another of the units as just described with reference to FIG. 3, except for the fact that in this instance there is no damper. The joint thus provided is usually covered by tape 53 which may be adhesively attached or otherwise secured to the two lengths of duct. Such a joint may be provided between any two lengths of duct and could occur at the line 22 in FIG. 1, for example. The marginal ends of the two lengths of duct are separated by a very small gap 54 which need be no greater than typically would be no greater than the thickness of the sheet metal of which the connector member is formed.

Referring now to FIG. 4, the length of duct 56 is shown with an accessory mounted in the wall thereof, rather than across the end thereof as in FIG. 3. In this instance it is a splitter damper assembly and might be located as shown in FIG. 1, for example at 13 or 21. Again, as in FIG. 3, the same reference numerals are employed as in FIG. 2 to designate corresponding parts. In this instance, it is the portion 31 that is received through the wall 57 of the duct and the portions 38, 39, and 41 are disposed to receive the end of another length of duct thereon. This could be the branch duct 19 of FIG. 1, for example. The splitter damper 58 is mounted to a hinge 59 to pivot on a vertical axis of the hinge pin when the control handle 61 is operated, this handle being disposed below the duct section mounted to the channels. Some rivets are shown at 62 and a flange at 63 to illustrate the connection of the remote ends of the rail together after folding along the three lines perpendicular to the plane of the flange 39. Because the flange 39 determines the location of the connector in the duct wall 57, as well as providing the abutment for the length of duct to be slid onto the connector and into the channels thereof, it can be referred to as a locator rail. The duct length to be mounted on the unit in the channels can be taped to the wall 57 in the same general manner as described above with reference to FIG. 3.

Figure 8:
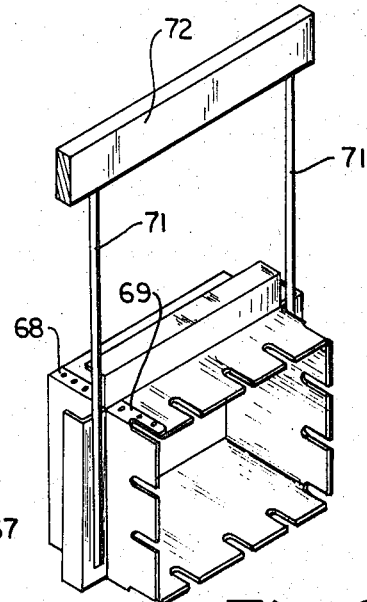
FIG. 8 is a perspective view of a frame formed from a member of the type shown in FIG. 7.
Figure 7:
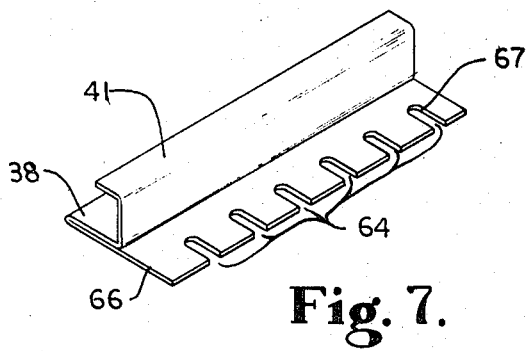
FIG. 7 is a perspective view of a connector rail incorporating features of the invention as shown in FIG. 2, with some additional notches to facilitate forming the rail into a frame.

Referring now to FIG. 7, a rail unit is shown which is exactly like that of FIG. 2 except for the fact that it incorporates horizontally spaced notches 64 in the portion of the base rail extending opposite the channel therein. Because of the fact that this unit is otherwise the same as that of FIG. 2, the same reference numerals will be employed except for the notched base rail which will be referred to as 66. The notches facilitate folding along lines perpendicular to the channel-forming fold lines. They might normally be spaced two inches apart and be one and one-half inches in depth. The remaining fifteen-sixteenths of an inch from the ends 67 of these notches to the plane of lateral locating flange 39 can be un-notched. The notches facilitate folding of the rail unit to form the frame shown in FIG. 8, this being accomplished in the same manner as described above with reference to FIGS. 2 and 3. The tabs or end flanges 68 and 69 are shown connected to the opposite ends of the base rail to secure the corners. Rivets are used in the illustrated example. As described above with reference to FIGS. 2 and 3, the channels of the frame receive the ends of the duct-forming boards or folded board, whereby the length of duct is supported on the connectors and vice-versa. As shown in FIG. 8, the lateral flanges forming the locator rails of the side channels of the connector have hangers 71 affixed thereto and whose upper ends are connected to a building framing member 72. This provides a convenient way to support the duct system from ceiling structure. No special straps are required, and no special protection is needed for the duct board itself. It need not be slotted or grooved except possibly an end groove to the limited degree needed to accommodate the hanger portion 71 mounted on the locator rail. The tape can be applied just as described above with reference to FIG. 3.

Referring now to FIG. 5, the rail unit of FIG. 2 or 7 is employed in an elbow between the duct portions 26 and 28. In this instance, the rail is not folded along lines perpendicular to its length, but instead is provided with tabs on the opposite ends thereof, and only two such units are provided. As shown in FIG. 5, the turning vane assembly includes a top plate 76 having the turning vanes 24 affixed thereto. A lower plate like plate 76 and identified in FIG. 1 as 77 has the lower ends of the turning vanes secured thereto. At the throat of the elbow, the end flange 78 is riveted to the top plate 76 of the turning vane assembly, and the lower end of the rail unit likewise has a flange riveted to the lower plate of the turning vane assembly. The rail unit has the retainer rail 41, the locator rail 39, and the base rail portion 38 forming a channel receiving the one wall of the duct 28, with the flanges 78 being turned over at both ends of the base rail. The marginal edge of the base rail is turned inwardly at 79 to form a second channel at 81 to receive the wall of the duct 26. Tape may be applied at the joint as indicated at 82.

At the outer end of the elbow, a like rail unit is provided, the base rail 38 having the inwardly turned flange or marginal edge portion 79A forming the channel 81A receiving the outer wall of duct 26. In this instance, however, the end flanges 83 (only one being shown in the drawing), are formed at the ends of the retainer rail portion, rather than the base rail portion. Tape may also be applied at this corner as indicated at 84 and 86, or a single strip can be employed to cover the entire corner, if desired. It should be noted that hangers can be attached to either the turning vane assembly or the rails themselves and suspended from a ceiling to support the duct assembly at the elbow, if desired.

Referring now to FIG. 6, still another accessory is shown mounted to the rail unit and in this instance it is the heat exchanger 16. It is received inside the inner faces of the base rail portions of the four sides of the frame. Again, as in the example of FIG. 5, a flange 87 is provided on the base rail and can serve as a face for fastening a flange 88 connected to the fin and tube assembly 89 of the heat exchanger. Then, if desired, another of the rail units like that shown in FIG. 6 can be connected on the other side of the heat exchanger flange, with the duct continuing from that point on. Also some hangers 91 can be connected to the heat exchanger assembly or to the rails at this location for appropriate support purposes.

It should be understood that for the splitter damper to operate properly, it must be adjustable so that its edge projects into the air flow. Accordingly it must project beyond the edge 32 and into the air flow. This is indicated schematically in FIG. 1. In this event it is also desirable that the length of the base rail from the plane of the locator rail 39 to the edge 32 not exceed the thickness of the wall of the duct. In other words it should be less than one inch in such instances. It will be recalled also that the embodiment of FIG. 7 provides approximately one inch from the plane of the locator rail to the bottom of the notches. In addition to facilitating the bending of the unit, it also facilitates bending of the portions between the notches to form flanges such as at 79 and 79A in FIG. 5, 87 in FIG. 6, and also permits utilization of such flanges on the interior face of a duct wall as at 57 in FIG. 4. This aids to hold the connector in the duct wall and avoids any projection of the base rail into the air stream.

It has been stated that the folding of the rail unit along lines perpendicular to the section-forming fold lines 33 and 34 provides a polygonal frame. The described embodiment have employed a four sided polygonal frame, except in FIG. 5 wherein no frame at all is provided, only two lengths of the rail unit being used. It should be recognized that the polygonal frame can have more than four sides and, in fact, it can be formed into essentially a circle by providing a sufficient number of cuts in the flange 41 and locator rail or web 39. Also the frame can be employed for connection to various accessories in addition to those described herein. Examples are round diffuser adapters, reinforced connectors, inspection doors, registers, and side-by-side duct connections. Therefore, while the invention has been disclosed and described in some detail in the drawings and foregoing description, they are to be considered as illustrative and not restrictive in character, as other modifications may readily suggest themselves to persons skilled in this art and within the broad scope of the invention, reference being made to the appended claims.

The invention claimed is:
1. A duct connection comprising:
   a first sheet of metal beginning at a first marginal edge and folded back upon itself along a first fold line, and then folded outwardly along a second fold line parallel to said first fold line and located between said edge and said first fold line, and then folded back along a third fold line parallel to said second fold line, and extending to a second marginal edge, said second marginal edge being located between said first and second fold lines, the portions between said first, second and third fold lines and said second edge forming a channel to receive a duct member therein, and the distance between said second and third fold lines being greater than three times the thickness of said sheet, whereby the width of said channel is greater than three times the thickness of said sheet.
2. The combination of claim 1 wherein said sheet is further folded to form a polygonal frame with the ends of the sheet connected to complete the frame, thereby dividing said channel into a plurality of channel sections, all of said channel sections facing in a direction perpendicular to the plane of said polygon.
3. The combination of claim 2 and further comprising:
   duct boards of insulating material and having marginal portions received in said channel sections and supported therein, said duct boards providing a first length of duct of polygonal cross-sectional shape matching that of the frame of channel sections.
4. The combination of claim 3 and further comprising:
   additional duct boards of insulating material and having marginal portions received on the connector portion adjacent said first edges, said additional duct boards providing an additional length of duct communicating with said first length of duct through said connector.
5. The combination of claim 4 wherein said first and additional lengths of duct are taped together to provide a fluid-tight length of duct between the remote ends of said first and additional lengths of duct.

References Cited
UNITED STATES PATENTS

| | | | |
|---|---|---|---|
| 1,762,766 | 6/1930 | De Garay | 285—417X |
| 1,811,277 | 6/1931 | Mosley | 285—417X |
| 2,050,023 | 8/1936 | Slayter | 285—293 |
| 2,183,174 | 12/1939 | Smith | 285—183X |
| 2,594,838 | 4/1952 | Alexander et al. | 138—Glass Fiber |
| 2,966,169 | 12/1960 | Reece | 98—41X |
| 3,415,543 | 12/1968 | Keating | 285—424X |

DAVE W. AROLA, Primary Examiner

U.S. Cl. X.R.

285—424